United States Patent
Cannell et al.

(10) Patent No.: US 7,841,444 B2
(45) Date of Patent: Nov. 30, 2010

(54) SEISMIC VIBRATOR BASEPLATE

(75) Inventors: William A. C. Cannell, Nesbru (NO); Malcolm Francis, Crawley Down (GB)

(73) Assignee: WesternGeco L.L.C., Houston, TX (US)

(*) Notice: Subject to any disclaimer, the term of this patent is extended or adjusted under 35 U.S.C. 154(b) by 146 days.

(21) Appl. No.: 12/168,127

(22) Filed: Jul. 5, 2008

(65) Prior Publication Data
US 2010/0000819 A1    Jan. 7, 2010

(51) Int. Cl.
*G01V 1/04*    (2006.01)
(52) U.S. Cl. .................. 181/121; 181/101; 181/113; 181/118; 181/108; 181/139; 367/912; 367/189; 367/190; 73/645; 73/632; 73/649
(58) Field of Classification Search ............ 181/121, 181/101, 113, 118, 108, 139, 142; 367/912, 367/189, 190; 73/645, 632, 649
See application file for complete search history.

(56) References Cited

U.S. PATENT DOCUMENTS

| | | | | |
|---|---|---|---|---|
| 3,983,957 A * | 10/1976 | Silverman | ................ | 181/121 |
| 4,135,598 A * | 1/1979 | Stafford | ................ | 181/114 |
| 4,248,324 A * | 2/1981 | Mifsud | ................ | 181/121 |
| 4,799,572 A * | 1/1989 | Airhart | ................ | 181/114 |
| 4,871,045 A * | 10/1989 | Cole | ................ | 181/114 |
| 5,113,966 A * | 5/1992 | Gregory et al. | ................ | 181/106 |
| 5,396,029 A | 3/1995 | Talke | | |
| 6,253,549 B1 | 7/2001 | Ambs | | |
| 6,338,394 B1 * | 1/2002 | Meynier | ................ | 181/113 |
| 6,418,081 B1 * | 7/2002 | Sen et al. | ................ | 367/99 |
| 2007/0235250 A1 * | 10/2007 | Krumhansl et al. | ........ | 181/121 |

* cited by examiner

*Primary Examiner*—Elvin G Enad
*Assistant Examiner*—Forrest M Phillips

(57) ABSTRACT

One example of a seismic vibrator system includes a baseplate having a bottom surface and a coupling mechanism, the coupling mechanism being operable to a deployed position; a hold-down mass connected to the baseplate; a lifting mechanism in operational connection with the hold-down mass and the baseplate to apply a selected hold-down weight to the baseplate; and a driving mechanism functionally connected to the baseplate to transmit seismic energy through the baseplate into a ground surface to which the baseplate is coupled, wherein the coupling mechanism is urged outward from the bottom surface and into physical contact with the ground surface when operated to the deployed position.

19 Claims, 2 Drawing Sheets

SEISMIC VIBRATOR BASEPLATE

TECHNICAL FIELD

The present invention relates in general to seismic operations and more specifically to mechanisms and methods for coupling a vibrator baseplate to the surface of the ground.

BACKGROUND

Commonly, seismic vibrators use a heavy baseplate to provide a contact point with the ground for transmission of seismic signals from the vibrator into the ground. Proper coupling between the baseplate and the ground surface must be obtained and maintained to transmit a selected seismic signal into the earth. A proper coupling between the baseplate and the ground enables the vibrator to emit a high fidelity sweep. Improper or inconsistent coupling can result in the degradation of the fidelity of the vibrator output, increased distortion, and inconsistent amplitude through the sweep. There is a continuing desire to facilitate consistent and full coupling between a vibrator baseplate and the ground surface.

SUMMARY

In view of the foregoing and other considerations, the present invention relates in general to seismic operations and more specifically to methods and apparatus for promoting coupling between a vibrator baseplate and ground.

In one example, a baseplate for a seismic vibrator includes a body having a substantially rigid bottom surface and a coupling mechanism carried by the body, wherein the coupling mechanism is extendable from the bottom surface to a deployed position.

An example of a seismic vibrator system includes a baseplate having a bottom surface and a coupling mechanism, the coupling mechanism being operable to a deployed position; a hold-down mass connected to the baseplate; a lifting mechanism in operational connection with the hold-down mass and the baseplate to apply a selected hold-down weight to the baseplate; and a driving mechanism functionally connected to the baseplate to transmit seismic energy through the baseplate into a ground surface to which the baseplate is coupled, wherein the coupling mechanism is urged outward from the bottom surface and into physical contact with the ground surface when operated to the deployed position.

An example of a method for promoting coupling between a vibrator baseplate and the ground surface for transmitting seismic energy into an earthen formation includes the steps of positioning a seismic vibrator in a selected location on a ground surface, the seismic vibrator having a baseplate and a hold-down mass, the baseplate including a body having a bottom surface and a coupling mechanism; positioning the baseplate so that bottom surface physically contacts the ground surface; applying hold-down weight to the baseplate; actuating the coupling mechanism outward from the bottom surface toward the ground surface; and transmitting seismic energy through the baseplate to the earthen formation.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
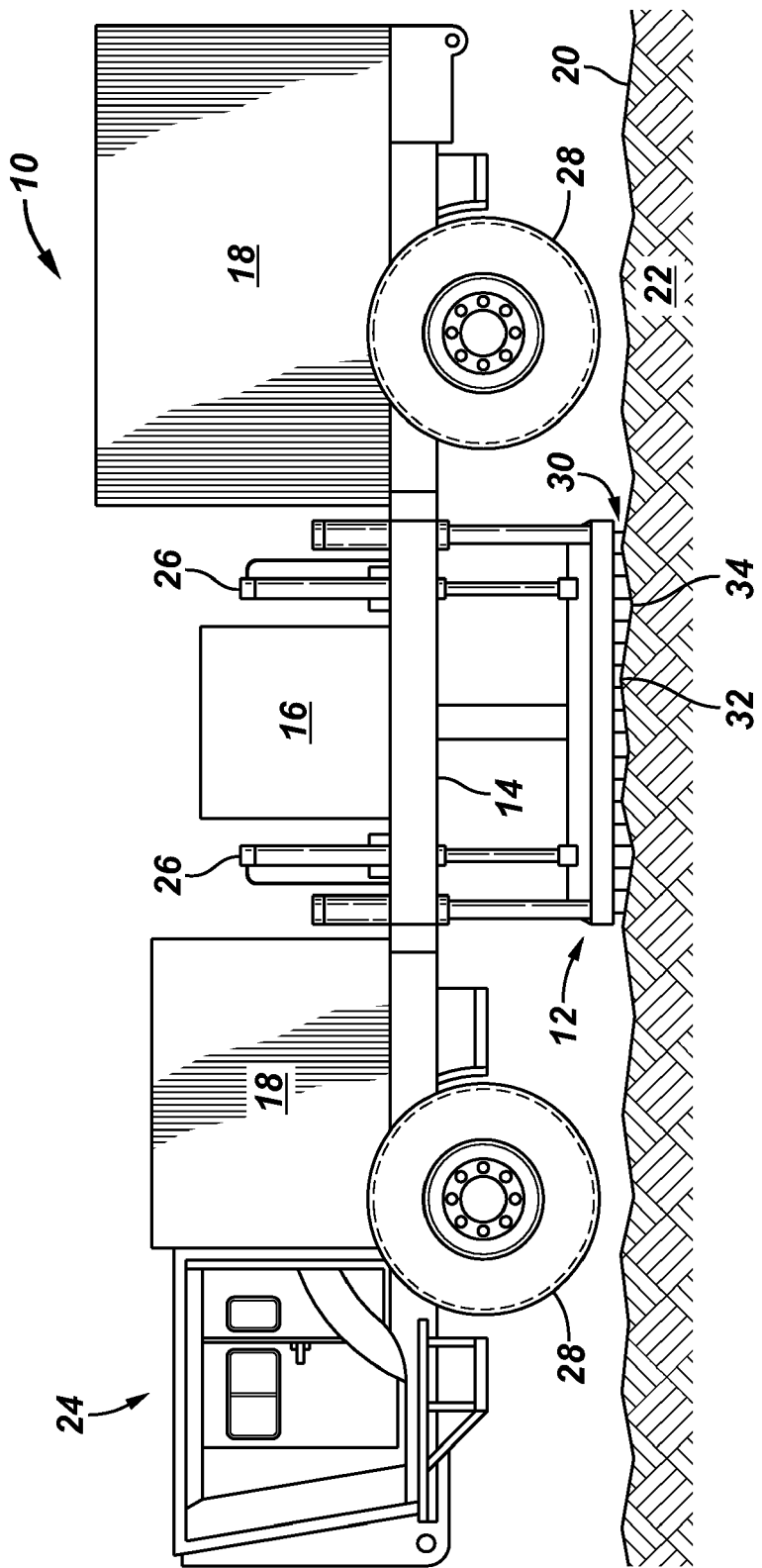
FIG. 1 is an elevation view of an example of a seismic system utilizing a baseplate assembly of the present invention.

Refer now to the drawings wherein depicted elements are not necessarily shown to scale and wherein like or similar elements are designated by the same reference numeral through the several views.

FIG. 1 is an elevation view of an example of a seismic vibrator system, generally denoted by the numeral 10, utilizing a baseplate assembly 12 of the present invention. System 10 includes baseplate assembly 12, a hold-down mass 14, a driver 16, and control and operation equipment generally denoted by the numeral 18. Control and operation equipment 18 may include without limitation, electronic systems, computing systems, pressurized fluids sources, motors, engines and the like.

Baseplate assembly 12 is shown positioned in contact with a ground surface 20 of earthen formation 22 in FIG. 1. A driver 16 is operationally connected to baseplate assembly 12 to induce vibrations in baseplate assembly 12 and thus in formation 22. Hold-down mass 14 is disposed above and connected to baseplate assembly 12 to promote and maintain coupling between baseplate assembly 12 and surface 20 as baseplate assembly 12 vibrates. In the illustrated example hold-down mass 14 includes vehicle 24 and the associated equipment. The full or partial weight of hold-down mass 14 may be applied to baseplate assembly 12 via lift mechanisms 26, illustrated herein as hydraulic jacks. Hold-down mass 14 is fully applied in FIG. 1 as illustrated by tires 28 being lifted off of surface 20. Jacks 26 are functionally and operationally connected to control and operation equipment 18.

Baseplate assembly 12 includes a coupling mechanism, denoted generally by the numeral 30, to promote physical contact and coupling between baseplate assembly 12 and surface 20. In particular, coupling mechanism 30 facilitates proper coupling between baseplate assembly 12 and an irregular contour of surface 20 by maximizing the surface area of the bottom surface 38 (FIG. 2) that physically contacts ground surface 20. "Irregular contour" of surface 20 is utilized herein to describe surface 20 as being uneven, for example having peaks 32 and valleys 34. Proper coupling is utilized herein to represent coupling between baseplate assembly 12 and surface 20 to promote emitting a seismic signal into formation 22. Coupling mechanism 30 is illustrated in the example of FIG. 1 in the deployed position.

Figure 2:
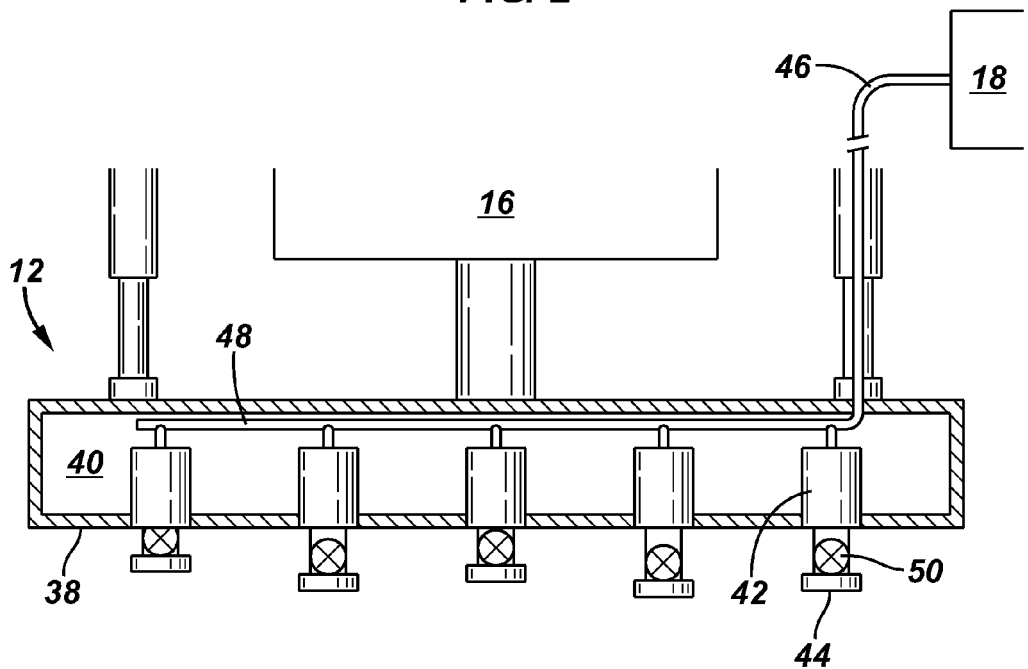
FIG. 2 is a partial cross-sectional view of an example of a baseplate assembly of the present invention.

FIG. 2 is a partial cross-sectional view of an example of a baseplate assembly 12 of the present invention shown in isolation. Baseplate assembly 12 includes a body 36 having a bottom surface 38 and coupling mechanism 30. Body 36 may be formed in various configurations such as without limitation a substantially planar member or as a domed member. Body 36 is commonly a rigid member constructed of a relatively heavy metal. Bottom surface 38 in the present example is a substantially rigid, planar surface oriented toward the ground surface. In the illustrated example, body 36 is configured as a housing defining a cavity 40.

Coupling mechanism 30 is carried by baseplate assembly 12 and is operational or actuatable between a retracted position and a deployed position. Coupling mechanism 30 is illustrated in the deployed position in FIG. 1 to provide physical contact between baseplate assembly 12 and ground surface 20. Coupling mechanism 30 is illustrated in the retracted position in FIG. 3.

In the illustrated example, coupling mechanism 30 includes a plurality of extendable members 42. Extendable members 42 are illustrated herein as hydraulic pistons. Each extendable member 42 may further include a foot 44. In FIG. 2, hydraulic pistons 42 are illustrated as positioned substantially within cavity 40 such that foot members 44 may be extended outward from bottom surface 38. In other examples, such as wherein body 36 is a planar or substantially planar member, extendable members 42 may be positioned atop body 36 and extend therethrough such that foot members 44 extend outward from surface 38.

Foot 44 may be hingedly or pivotally connected to member 42 in a manner such that foot 44 may be positioned relative to and in response to physical contact with surface 20 (FIG. 1). Foot member 44 may be constructed of a rigid or pliable material. Members 42 are operationally connected to equipment 18 as illustrated by line 46. Line 46 may be an electrical line, conduit, or other mechanism suited to functionally and operationally connect members 42 to equipment 18.

The plurality of foot members 44 may in some configurations form a substantially continuous bottom surface of baseplate assembly 12 that substantially matches the contour of the ground surface. For example, foot members 44 may be positioned essentially edge to edge such that a substantially continuous surface is formed.

In FIG. 2, equipment 18 includes a hydraulic fluid source in connection with members 42 via conduit 46 and a manifold 48. Each member 42, in this example, operates separate and independent from the other members 42. Separate and independent is utilized herein to mean by way of example that upon activation to the deployed position (FIG. 1) one element may extend a first distance from bottom surface 38 that is different from the distance that one or more of the other members 42 extend. For example, with reference to FIGS. 1 and 3, upon activation to the deployed position, a member 42 that is disposed on a ridge 32 will extend from surface 38 a distance that is less than the distance that a member 42 that is disposed over a valley 34 will extend from surface 38.

In some examples of baseplate assembly 12 one or more individual members 42 may include an accelerometer 50. Accelerometer 50 is operationally connected to equipment 18 in a manner so as to communicate data to an operator. Accelerometers 50 may be utilized to provide an estimate of the acceleration of baseplate assembly 12 so as to provide improved control and quality control relative to the use of a single accelerometer in connection with baseplate assembly 12.

Figure 3:
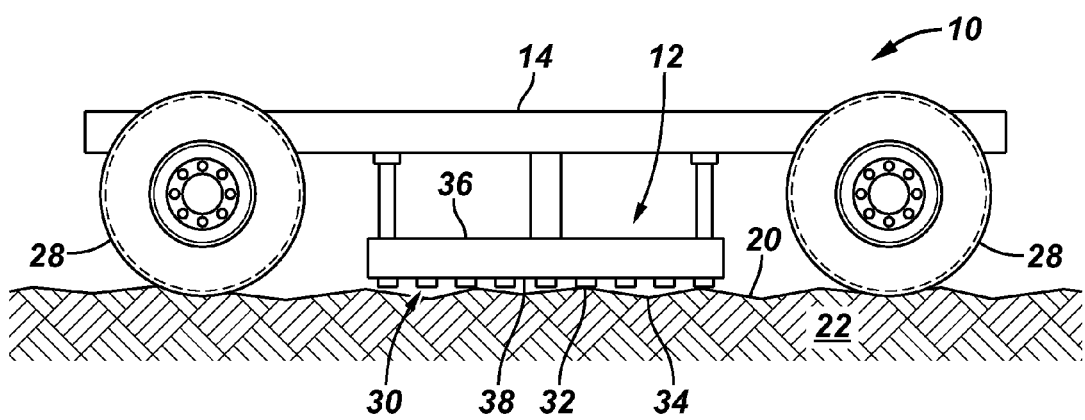
FIG. 3 is a conceptual illustration of a baseplate assembly of the present invention.

Refer now to FIG. 3 wherein a conceptual illustration of system 10 is provided showing coupling mechanism 30 in the retracted position. In the retracted position, foot members 44 are positioned proximate to bottom surface 38. In some embodiments foot members 44 may be positioned above surface 38 relative ground 20, positioned substantially in the same plane as surface 28, or positioned below surface 38.

FIG. 3 also illustrates an example of baseplate assembly 12 extended to a position for deployment of coupling mechanism 30. In this position baseplate assembly 12 has been extended away from hold-down mass 14 and in contact with ground surface 20. Hold-down weight of mass 14 has been applied to baseplate assembly 12 and ground surface 20 via lifting mechanisms 26. Portions of bottom surface 38 are in physical contact with ground surface 20, for example at peaks 32, and other portions of surface 38 are not in physical contact with ground surface 20, for example at valleys 34. Deployment of coupling mechanism 30, shown in FIG. 1, will provide additional physical contact with ground surface 20 and may improve seismic signal coupling.

Examples of methods for promoting coupling between baseplate assembly 12 and ground surface 20 and for transmitting seismic energy to a formation 22 are now described with reference to FIGS. 1-3. Vibrator system 10, illustrated as a vibrator truck or buggy, is positioned at a selected location for transmitting seismic energy into formation 22. Baseplate assembly 12 is positioned such that at least a portion of bottom surface 38 of body 36 is in physical contact with ground surface 20. Lifting mechanisms 26 are actuated to apply weight of hold-down mass 14 to baseplate assembly 12 against ground surface 20.

Coupling mechanism 30 is then actuated to the deployed position. In the deployed position, each extendable member is extended away from body 36 toward ground surface 20. Extendable members 42 are extended to the extent of their range or until contacting ground surface 20 to provide physical contact with ground surface 20 that was not achieved directly between bottom surface 38 and ground surface 20 and to promote a proper coupling to the ground surface.

Driver 16 may then be activated to emit seismic energy and a selected signal into formation 22 via baseplate assembly 12. Upon completion of a sweep, coupling mechanisms 30 may be retracted, baseplate assembly 12 lifted, and vibrator system 10 moved to another location.

From the foregoing detailed description of specific embodiments of the invention, it should be apparent that baseplate assemblies, methods of coupling a vibrator baseplate to a surface, and methods for emitting seismic signals and energy into formation that are novel have been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A baseplate for coupling a seismic vibrator to the irregular contour of a ground surface to transmit seismic energy into the earthen formation below the ground surface, the baseplate comprising:
    a body having a substantially rigid bottom surface; and
    a substantially rigid coupling mechanism carried by the body, the substantially rigid coupling mechanism comprising a substantially non-ground piercing foot member that is extendable from the bottom surface to a deployed position in physical contact along the irregular contour of the ground surface below the baseplate.

2. The baseplate of claim 1, wherein the substantially rigid coupling mechanism comprises a hydraulic cylinder.

3. The baseplate of claim 1, wherein the substantially non-ground piercing foot member substantially matches the contour of the ground surface when the substantially non-ground piercing foot member is in the deployed position.

4. The baseplate of claim 1, wherein the bottom surface of the body is substantially planar.

5. The baseplate of claim 1, wherein the bottom surface of the body is substantially planar. the ground surface.

6. The baseplate of claim 1, wherein the substantially non-ground piercing foot member comprises a plurality of substantially non-ground piercing foot members positioned substantially edge to edge with one another.

7. The baseplate of claim 1, wherein:
the substantially non-ground piercing foot member comprises a plurality of substantially non-ground piercing foot members; and
the substantially rigid coupling mechanism comprises a plurality of extendable members, each of the plurality of extendable members carrying one substantially non-ground piercing foot member of the plurality of substantially non-ground piercing foot members.

8. The baseplate of claim 7, wherein the plurality of substantially non-ground piercing foot members are positioned substantially edge to edge with one another.

9. The baseplate of claim 7, wherein the plurality of substantially non-ground piercing foot members comprise a pliable material for matching the irregular contour of the ground surface.

10. The baseplate of claim 2, wherein the hydraulic cylinder is positioned within a cavity formed by the body.

11. The baseplate of claim 1, wherein the substantially rigid coupling mechanism includes an accelerometer.

12. A method for promoting coupling between a vibrator baseplate and ground surface having an irregular contour for transmitting seismic energy into an earthen formation, the method comprising:
positioning a seismic vibrator in a selected location on the ground surface, the seismic vibrator having a baseplate and a hold-down mass, the baseplate including a body having a bottom surface and a substantially rigid coupling mechanism comprising a plurality of substantially non-ground piercing foot members;
positioning the baseplate in physical contact with at least a portion of the irregular contour of the ground surface;
applying hold-down weight to the baseplate;
establishing substantially continuous physical and coupling contact along the irregular contour of the ground surface below the baseplate in response to deploying the plurality of substantially non-ground piercing foot members outward from the bottom surface against the irregular contour of the ground surface; and
transmitting seismic energy to the earthen formation.

13. The method of claim 12, wherein the substantially rigid coupling mechanism comprises a plurality of extendable members, each extendable member comprising one substantially non-ground piercing foot member of the plurality of substantially non-ground piercing foot members.

14. The method of claim 12, wherein the plurality of substantially non-ground piercing foot members further comprise an accelerometer.

15. The method of claim 13, wherein the body forms an internal cavity and the plurality of extendable members are positioned substantially within the cavity.

16. A seismic vibrator system for coupling to a ground surface having an irregular contour, the system comprising:
a baseplate having a bottom surface;
a substantially rigid coupling mechanism comprising a plurality of substantially non-ground piercing foot members, the substantially rigid coupling mechanism operable to a deployed position wherein the plurality of substantially non-ground piercing foot members are in substantially continuous physical contact along the irregular contour of the ground surface;
a hold-down mass connected to the baseplate;
a lifting mechanism in operational connection with the hold-down mass and the baseplate to apply a selected hold-down weight to the baseplate and the plurality of substantially non-ground piercing foot members; and
a driving mechanism functionally connected to the baseplate to transmit seismic energy through the coupling of the baseplate and the substantially rigid coupling mechanism to the irregular contour of the ground surface when the plurality of substantially non-ground piercing foot members are in the deployed position.

17. The system of claim 16, wherein the substantially rigid coupling mechanism includes a plurality of extendable members, each extendable member carrying one substantially non-ground piercing foot member of the plurality of substantially non-ground piercing foot members.

18. The system of claim 16, wherein the plurality of substantially non-ground piercing foot members are arranged in a substantially edge to edge relationship.

19. The system of claim 16, further including an accelerometer disposed with the plurality of substantially non-ground piercing foot members.

* * * * *